: 3,111,415
PROCESS FOR THE PRODUCTION OF
REFRACTORY MATERIAL
Paul Metz, Dudelange, Luxembourg, assignor to ARBED Acieries Reunies de Burbach-Eich-Dudelange, Societe Anonyme, Grand Duchy of Luxembourg, a corporation of Luxembourg
No Drawing. Filed Apr. 20, 1960, Ser. No. 23,371
Claims priority, application Belgium May 8, 1959
3 Claims. (Cl. 106—58)

The present invention concerns a process for the production of refractory materials from magnesia.

The production of refractory materials from magnesia, as employed at present in metallurgy, is generally carried out by starting with a sintered material (MgO) in the form of grains which are agglomerated by well-known methods. This material intended for agglomeration commonly contains grains of different size of which the diameter may be from some hundredths of a millimeter to some millimeters or even some centimeters.

In known processes, the grains of magnesia intended for the production of refractories are sintered in the same way whatever their size.

The present invention has as its object a process which permits one to obtain, by a combination of sintered magnesia particles, a refractory material which is chemically and thermally much more resistant than the refractory materials obtained by the abovementioned conventional processes.

The process according to the invention utilizes a magnesia of which the major part of the large grains are sintered with formation of a first agglomerate having an apparent density greater than that of a second agglomerate formed by the sintering of the major part of the small grains.

A more specific aspect of the process according to the invention consists in using magnesia of which the particles having a diameter greater than one tenth and preferably one eighth of the average coarse-grain diameter are sintered to an apparent density greater than 2.8 g./cm.$^3$ and of which the particles having a diameter less than one-tenth and preferably one-twelfth of the average coarse-grain diameter are sintered to an apparent density less than 2.8 g./cm.$^3$.

In the present description and claims the expression "average coarse-grain diameter" means the arithmetic mean of the diameters of the smallest and the largest grains present in the portion of mixture containing the largest grains and representing 20% of the total weight of this mixture.

It has further been found economically advantageous to select the large grains from a material chemically less pure than that of the small grains, which latter should consist of the industrially purest possible material. The large grains may possibly consist of dolomite or of dolomitic magnesia.

It is not outside the scope of the present invention to add to the magnesia organic binders or reducing materials such as metallurgical tar or pitch or carbon, for example 2 to 10% carbon preferably in the form of very fine graphite. Furthermore, grains of chromite can be added to the magnesia.

The fine grains should preferably be carbonized and/or graphitized when they are mixed after the first sintering with the organic binders, and subsequently heated with the binder in a neutral or reducing atmosphere to temperatures from 400 to 2000° C. This operation is preferably repeated several times before the grinding of the fine fractions to the desired particle size in such a manner that the content of carbon is of the order of 2 to 15%.

The following example of the application of the process according to the invention to a particular case of the manufacture of a bed of a converter is not intended in any limiting sense.

For the construction of this bed there is used 6,000 kilograms of sintered magnesia of which the portion containing the largest grains and representing 20% of the total weight of the mixture contains particles of 12 to 20 millimeters in diameter. In the sense defined above, the average coarse-grain diameter is thus 16 millimeters. According to the invention, the grains having a diameter greater than 2 millimeters or one-eighth of the aforementioned coarse-grain diameter, consisting of Austrian magnesia containing about 5% of iron, are more highly sintered, to an apparent density of 3 g./cm.$^3$. The grains of a diameter less than one-twelfth of that diameter, that is to say 1.3 millimeters, consisting of sea-water magnesia are sintered to an apparent density of 2.6 g./cm.$^3$. The intermediate grains having a diameter between 1.3 and 2 millimeters and consisting of industrially pure Greek magnesia are sintered to an apparent density of 2.9 g./cm.$^3$. These intermediate grains could be sintered to a lower apparent density without departing from the scope of the invention.

The process according to the invention is applicable to a material of which the particle size is discontinuous, that is to say in which certain fractions of grains of intermediate size are missing, for example a magnesia in which there are no particles of 0.3 to 2 millimeters.

What I claim is:

1. A process for producing a refractory product, comprising the steps of sintering a first fraction of magnesia particles with grain sizes above substantially 2 mm. with formation of a first agglomerate with an apparent density of substantially 3 g./cm.$^3$, sintering a second fraction of magnesia particles with grain sizes below substantially 1.3 mm. with formation of a second agglomerate with an apparent density of substantially 2.6 g./cm.$^3$, and combining said agglomerates.

2. A process for producing a refractory product, comprising the steps of sintering a first fraction of magnesia particles with grain sizes above substantially 2 mm. with formation of a first agglomerate with an apparent density of substantially 3 g./cm.$^3$, sintering a second fraction of magnesia particles with grain sizes below substantially 1.3 mm. with formation of a second agglomerate with an apparent density of substantially 2.6 g./cm.$^3$, sintering a third fraction of magnesia particles with grain sizes ranging between substantially 1.3 mm. and 2 mm. with formation of a third agglomerate with an apparent density between substantially 2.6 g./cm.$^3$ and 3 g./cm.$^3$, and combining said agglomerates.

3. A process for producing a refractory product, comprising the steps of sintering a first fraction of dolomitic particles with grain sizes above substantially 2 mm. with formation of a first agglomerate with an apparent density of substantially 3 g./cm.$^3$, sintering a second fraction of substantially pure magnesia particles with grain sizes below substantially 1.3 mm. with formation of a second agglomerate with an apparent density of substantially 2.6 g./cm.$^3$, and combining said agglomerates.

References Cited in the file of this patent
UNITED STATES PATENTS 2,579,886    Vettel                  Dec. 25, 1951
2,943,240    Martinet             June 28, 1960